(12) United States Patent
Löf et al.

(10) Patent No.: US 6,547,497 B2
(45) Date of Patent: Apr. 15, 2003

(54) AUTOMATIC CHIP REMOVAL DEVICE

(75) Inventors: Klas-Arne Löf, Skövde (SE); Mats Andersson, Skövde (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 09/683,170

(22) Filed: Nov. 28, 2001

(65) Prior Publication Data

US 2002/0054801 A1 May 9, 2002

Related U.S. Application Data

(63) Continuation of application No. PCT/SE00/00889, filed on May 5, 2000.

(30) Foreign Application Priority Data

May 28, 1999 (SE) ................................. 9901945

(51) Int. Cl.$^7$ .............................. B23C 1/02; B23C 9/00; B23Q 11/08; B23Q 11/02; B23Q 11/10
(52) U.S. Cl. ................ 409/131; 409/134; 409/136; 409/137; 29/DIG. 59; 29/DIG. 56; 29/DIG. 86; 451/451; 74/612
(58) Field of Search .................... 409/131, 132, 409/134, 137, 136; 29/DIG. 59, DIG. 86, DIG. 60, DIG. 56, DIG. 83, DIG. 84; 408/58, 56, 67, 97; 451/451; 83/860; 74/612

(56) References Cited

U.S. PATENT DOCUMENTS

| | | | | |
|---|---|---|---|---|
| 3,466,811 A | * | 9/1969 | Suddarth ................ 451/451 |
| 3,786,846 A | * | 1/1974 | Mehring ............. 29/DIG. 59 |
| 3,936,213 A | * | 2/1976 | Kappel .................... 408/67 |
| 4,037,982 A | | 7/1977 | Clement |
| 4,515,505 A | * | 5/1985 | Frisbie et al. ........... 408/97 |
| 4,530,627 A | | 7/1985 | Kosmowski |
| 4,921,375 A | * | 5/1990 | Famulari ........... 29/DIG. 83 |
| 5,160,230 A | * | 11/1992 | Cuevas .................... 408/67 |
| 5,332,343 A | * | 7/1994 | Watanabe et al. ........ 409/137 |
| 5,458,443 A | * | 10/1995 | Belge et al. ............. 408/67 |
| 5,607,269 A | * | 3/1997 | Dowd et al. ........ 29/DIG. 56 |
| 5,779,402 A | * | 7/1998 | Kameda .................. 409/137 |
| 6,079,078 A | * | 6/2000 | Byington ................. 408/67 |
| 6,116,830 A | * | 9/2000 | Azema .................... 409/134 |
| 6,120,222 A | * | 9/2000 | Hiramoto et al. ....... 409/134 |
| 6,146,066 A | * | 11/2000 | Yelton .................... 409/137 |
| 6,164,881 A | * | 12/2000 | Shono .................... 409/137 |

FOREIGN PATENT DOCUMENTS

| | | |
|---|---|---|
| DE | 3734127 A1 | 4/1989 |
| DE | 4223480 A1 | 1/1994 |
| GB | 2285125 A | 6/1995 |
| WO | WO97-22832 A1 * | 6/1997 |

* cited by examiner

Primary Examiner—A. L. Wellington
Assistant Examiner—Erica E Cadugan
(74) Attorney, Agent, or Firm—Howrey, Simon, Arnold & White LLP

(57) ABSTRACT

The present invention relates to a method and a device in the chip-removing machining of a work-piece by means of a rotatable tool with a shaft arranged in a headstock. The tool is displaceable in an axial direction both towards and away from the work-piece, and in a plane substantially perpendicular to the arbor. Arranged around a machining point is an enclosure. The enclosure has a first opening that is designed to press against the work-piece around the point to be or being machined. A second opening in the enclosure is made in a wall substantially perpendicular to the shaft. This opening is designed, during machining, to press against a plane plate arranged behind the tool and around the headstock, substantially perpendicular to the arbor, so that during machining there is a substantially enclosed space in the area around the tool and the machining point. The device includes a line for delivering cutting fluid to the machining point. The enclosure can be provided with an outlet opening through which chips that are removed are evacuated from the enclosure by the delivered cutting fluid.

13 Claims, 1 Drawing Sheet

AUTOMATIC CHIP REMOVAL DEVICE

CROSS REFERENCE TO RELATED APPLICATIONS

The present application is a continuation of International Application No. PCT/SE00/00889, filed May 5, 2000, which claims priority to Swedish Application No. 9901945-7, filed May 28, 1999. Both applications are expressly incorporated by reference herein in their entirety.

BACKGROUND OF INVENTION

1. Technical Field

The present invention relates to a method and device for removing machined chips from a work-piece. More specifically, the invention relates to a method and device for removing machined chips produced by means of a tool rotating on a shaft or spindle arranged in a headstock whereby downtime and the amount of cutting fluid required during machining is reduced.

2. Background Art

When tooling or machining a piece using existing automatic chip removal machines, very large quantities of chips are often produced. These machines may or may not used a cutting fluid for cooling the machining process. Still, even if the actual machining does not require the supply of cutting fluid for cooling purposes, in order to improve chip removal, large quantities of cutting fluid can be used to wash or carry the chips away.

Typically, the cutting fluid used has a low surface tension. One consequence of this property is that it can easily get into undesirable places such as seals and bearings, and can also negatively affect towards electrical and mechanical components. During machining, chips and cutting fluid tend to be thrown around in an uncontrolled manner. This can cause the machine to be shut down for servicing, reducing its availability for tooling pieces. When machining is in progress, the dispersement of the cutting fluid and chips makes it is very difficult to get close to the machine.

Attempts have been made to reduce the dispersion of chips and cutting fluids by arranging a tunnel around the part that is to be machined, clamping devices for the latter and the machining tool. This has been successful in containing the chips and cutting fluid within a more restricted area. However, such a tunnel does not prevent various parts, such as bearing heels, conveyors for moving the part, indexing elements, and sensors from being exposed.

Further, the chips can interfere with sensors for controlling the clamping and machining, leading to false alarms. The chips can also get jammed when clamping the part to be tooled, leading to incorrect machining, production stoppages, and so forth.

SUMMARY OF INVENTION

The present invention provides a method and device for removing machined chips. With the present invention, the consumption of cutting fluid can be reduced, bringing economic and environmental improvements together with fewer and shorter machine stoppages or down time. This, in turn, increases the machines manufacturing availability and improved manufacturing economy and more available production time.

The present invention includes a tool or die that rotates with a shaft or arbor on a headstock or lathe. The tool can be axially displaced both towards and away from the piece being cut or machined in a plane that is substantially perpendicular to the arbor. An enclosure is provided that is arranged around a machining point on the work-piece. A first opening in the enclosure is provided that bears or presses tightly against the piece to be machined. A second opening substantially perpendicular to the arbor is located in a wall of the enclosure. During tooling or machining, this second opening is able to press tightly against a plane plate that is substantially perpendicular to the arbor and arranged behind the tool and around the headstock. By being substantially perpendicular to the arbor, a substantially enclosed space is created in the area around the tool or die and the machining point, or place on the piece being machined.

With the present invention, when the tool is applied to the work-piece, the plate is axially displaced together with the tool against a return force while pressing tightly around the second opening. In doing so, when the tool is applied to the work-piece during machining, the wall of the enclosure having the second opening is axially displaced in relation to the work-piece against a return force, enabling the wall and second opening to tightly press against the plate, thereby maintaining an enclosed space around the point of the work-piece being machined.

In one embodiment of the present invention, the tool is movable in the plane of the plate within the area enclosed by the second opening while pressing tightly against the wall. In another embodiment of the present invention, the enclosure is provided with an outlet opening through which chips produced during the machining process are evacuated. This evacuation can be accomplished by the cutting fluid delivered to the machining point. Additionally, the outlet may have connected to it a negative pressure source. An example of a negative pressure source can include a suction fan.

In another embodiment of the present invention, the first opening has an outline that is congruent with but somewhat larger than the outline of the work-piece and a seal. The outline is designed to allow the work-piece to be at least partially introduced into the space produced by the enclosure into a machining position. An embodiment of the present invention may also be provided with a line for delivering cutting fluid that is arranged to open into the enclosed space.

BRIEF DESCRIPTION OF DRAWINGS

The invention will be explained in more detail below with reference to the attached FIGURE, wherein a side perspective of one embodiment of the chip removal device is provided, with the plate away from a wall of the enclosure.

DETAILED DESCRIPTION

Figure 1:
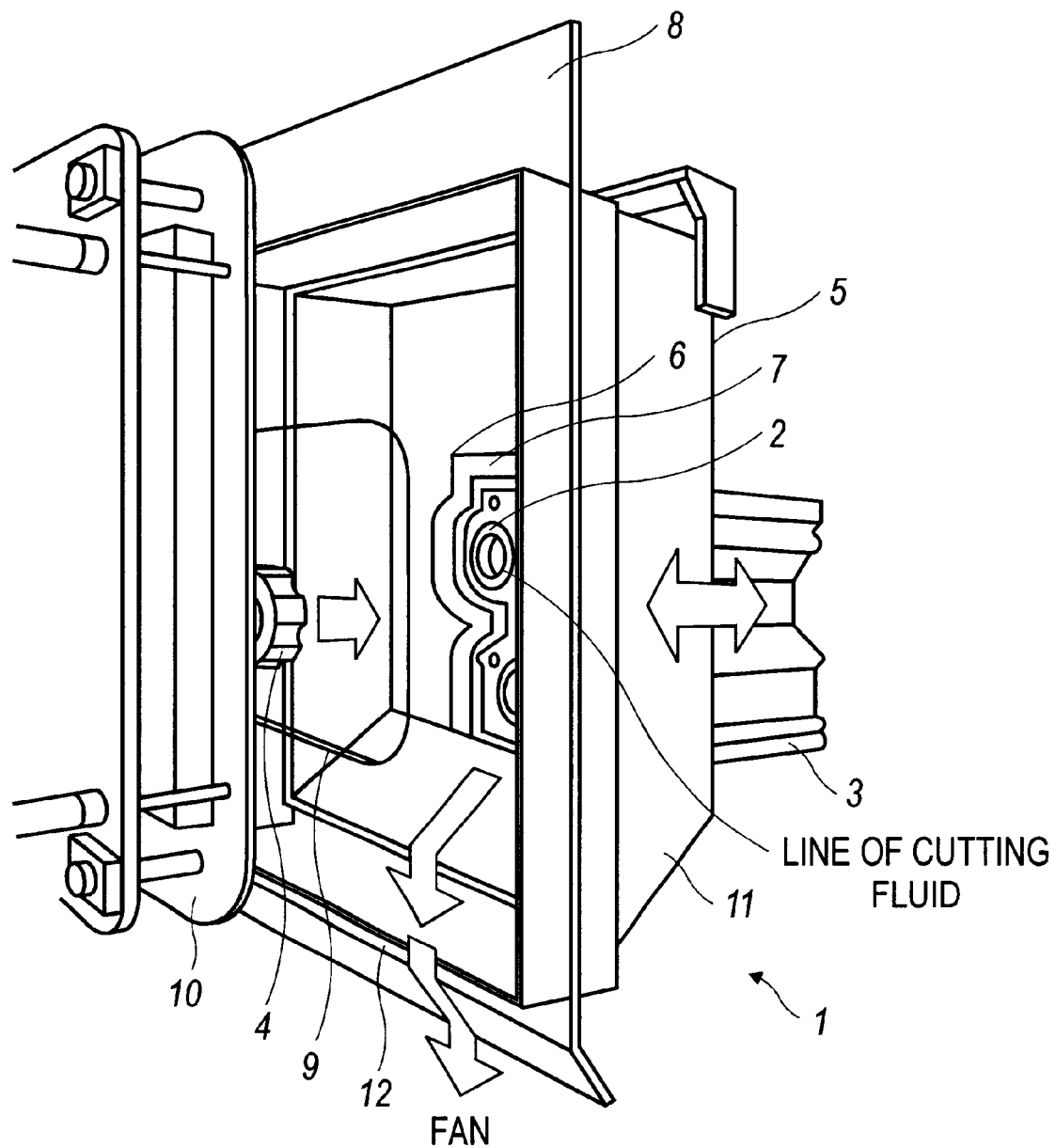

Referring to the FIGURE, reference numeral 1 generally denotes an enclosure designed to be arranged around a machining point 2 in a machine for chip-removing machining of a work-piece 3, represented in the FIGURE as an engine block. A die or cutting tool 4 rotatable with an arbor or shaft (not shown) is arranged in a headstock. The tool 4 is displaceable in the axial direction of the arbor, both towards and away from the work-piece 3, in a plane perpendicular to the arbor for performing one or more machining operations on the work-piece 3.

The enclosure 1 has a first wall 5 facing the work-piece 3 with a first opening 6. The wall 5 and its opening 6 is designed to bear or press tightly against the work-piece 3 around that part of the work-piece 3 that is to be machined, or the machining point 2. As illustrated, the first wall 5 may have an opening 6, the outline of which is congruent with but somewhat larger than the surface that is to be machined. It may also have an opening 6 that somewhat larger than the outline of the work-piece 3, and a seal 7 that is designed to allow the work-piece 3 to be at least partially introduced into the space in a machining position while forming a seal against the work-piece 3.

A second wall 8 (shown transparently in the Figure) opposite the first wall 5 and substantially perpendicular to the arbor has a second opening 9. This second opening 9 allows the tool 4 to be introduced into the enclosure 1 in order to carry out the machining. When the headstock is displaced in the direction of the arbor during machining, the second wall 8 is designed to press tightly against a plane plate 10 axially arranged behind the machining tool 4 and around the headstock, substantially perpendicular to the arbor. In doing so, a substantially enclosed space is formed in the area around the tool 4 and the machining point 2. The enclosed space is formed by the two walls 5, 8 and a third circular wall 11 that joins the peripheries of the first and second walls. The plate 10 is arranged so that when the tool 4 is applied against the work-piece 3, the plate 10 can move against a return force in the direction of the arbor while continuing to press tightly against the second wall 8 of the enclosure. The plate 10 is also displaceable with the tool 4 in the plane perpendicular to the arbor while pressing tightly around the second opening 9 in the enclosure. This is because the plate 10 is larger than the second opening 9 so that it completely covers the opening 9 and presses around its periphery during the maximum displacement of the tool 4 permitted by the machine tool during machining.

In an alternative embodiment, the third wall 11 can be formed by a telescopic cover or flexible bellows, which by itself or with the aid of spring devices can generate the return force that is required to maintain a tight bearing contact between the second wall and the plate. In this way, it is also possible to make the second opening 9 and wall 8 of the enclosure 1 displaceable in relation to the work-piece 3 against a return force in the direction of the arbor. Because the wall 8 of the enclosure 1 containing the second opening 9 is formed in a part of the enclosure 1 that can move telescopically around a part of the enclosure 1 including the first opening 9 while maintaining the seal, it is possible to maintain not only the sealing contact against the plate 10, but also an enclosed space around the machining point 2 when the tool 4 is applied to the work-piece 3.

In one embodiment, the enclosure 1 has an outlet opening 12 at the bottom through which chips that are removed can be evacuated from the enclosure 1 by means of cutting fluid delivered to the machining point 2. This cutting fluid can be delivered to the machining point 2 in many different ways. For example, the cutting fluid can be delivered through the first opening 6 via the work-piece 3, or through the second opening 9 in connection with the machine tool 4, or by means of a line opening into the enclosed space. This line can be introduced into the enclosure 1 through a separate opening in the enclosure 1.

In one embodiment, a negative pressure source such as a suction fan (not shown) can be provided for further assisting the evacuation of chips and cutting fluid. This pressure source can be arranged in connection with the outlet opening 12.

While there has been disclosed effective and efficient embodiments of the invention using specific terms, it should be well understood that the invention is not limited to such embodiments as there might be changes made in the arrangement, disposition, and form of the parts without departing from the principle of the present invention as comprehended within the scope of the accompanying claims.

What is claimed is:

1. A method of removing chips produced while machining a work-piece, the method of chip removal comprising the steps of:

supplying a tool capable of rotating together with a shaft about a shaft axis, said shaft being arranged in a headstock, the tool being displaceable both towards and away from the work-piece and in a plane substantially perpendicular to the shaft axis, arranging an enclosure in which at least a portion of the work-piece is received, the enclosure surrounding a machining point on the work-piece, pressing a first opening in the enclosure against the work-piece around the machining point, applying the tool to the work-piece to achieve the machining, during the machining, pressing a second opening in a wall of the enclosure substantially perpendicular to the shaft axis against a plane plate that is substantially perpendicular to the shaft axis and arranged behind the tool and around the headstock, thereby creating a substantially enclosed space in the area around the tool and the machining point, and axially displacing the plate together with the tool while the plate is bearing around the second opening in the wall, whereby, when the tool is applied to the work-piece, the wall of the enclosure containing the second opening displaced axially in relation to the work-piece while the wall is pressing against the plate, thereby maintaining an enclosed space around the machining point.

2. The method according to claim 1 further comprising the step of moving the tool in the plane of the plate within the area enclosed by the second opening while pressing the wall against the plate.

3. The method according to claim 1 further comprising the step of evacuating the removed machined chips through an outlet opening in the enclosure.

4. The method according to claim 3 further comprising the step of delivering cutting fluid to the machining point, wherein the chips are evacuated from the enclosure through the outlet opening by the cutting fluid delivered to the machining point.

5. The method according to claim 3 further comprising the step of arranging a negative pressure source in connection with the outlet opening.

6. The method according to claim 5 wherein the negative pressure source is a suction fan.

7. A device in a machine for removing machined chips from a work-piece, the device comprising:

a shaft arranged in a headstock, a tool capable of rotating with the shaft about a shaft axis, wherein the tool is displaceable both towards and away from the work-piece and in a plane substantially perpendicular to the shaft axis, an enclosure in which at least a portion of the work-piece is received and arranged around a machining point on the work-piece, a first opening of the enclosure, wherein the first opening is designed to press against the work-piece around the machining point, a plane plate substantially perpendicular to the shaft axis and arranged behind the tool and around the headstock, and a second opening in a wall of the enclosure, the wall being substantially perpendicular to the shaft axis, wherein the wall presses against the plane plate during machining, creating a substantially enclosed space in the area around the tool and the machining point, wherein the plate is axially displaceable relative to the tool while the wall having the second opening of the enclosure is pressing against the plane plate, and wherein the wall having the second opening of the enclosure is axially displaceable relative to the work-piece while the wall having the second opening of the enclosure is pressing against the plane plate, thereby maintaining an enclosed space around the machining point;

an outline in the first opening conforming with but somewhat larger than an outline of the work-piece, and a seal arranged about the first opening for allowing the work-piece to be at least partially introduced into a machining position within the enclosure.

8. The device according to claim 7 wherein the tool is moveable in the plane of the plate within the area defined by the second opening while pressing the wall against the plate.

9. The device according to claim 7 further comprising a means of delivering cutting fluid to the machining point.

10. The device according to claim 7 further comprising an outlet opening for evacuating removed chips from the enclosure by means of the delivered cutting fluid.

11. The device according to claim 10, wherein the outlet opening is connected to a negative pressure source.

12. The device according to claim 11, the negative pressure source further comprising a suction fan.

13. The device according to claim 7 further comprising a line for delivering cutting fluid, the line opening into the enclosed space.

* * * * *